United States Patent
Arbabi et al.

(10) Patent No.: US 9,785,778 B2
(45) Date of Patent: *Oct. 10, 2017

(54) DIRECTED EXECUTION OF DYNAMIC PROGRAMS IN ISOLATED ENVIRONMENTS

(71) Applicant: Microsoft Technology Licensing, LLC, Redmond, WA (US)

(72) Inventors: Reza Arbabi, Redmond, WA (US); Wing Kwong Wan, Redmond, WA (US); George Raymond Derryberry, Jr., Seattle, WA (US); Michael C. Fanning, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,663

(22) Filed: Apr. 7, 2016

(65) Prior Publication Data

US 2016/0300066 A1    Oct. 13, 2016

Related U.S. Application Data

(63) Continuation of application No. 14/095,538, filed on Dec. 3, 2013, now Pat. No. 9,317,694.

(51) Int. Cl.
*G06F 21/57* (2013.01)
*G06F 11/36* (2006.01)
(Continued)

(52) U.S. Cl.
CPC ....... *G06F 21/577* (2013.01); *G06F 11/3688* (2013.01); *G06F 21/53* (2013.01);
(Continued)

(58) Field of Classification Search
CPC ....... G06F 21/52; G06F 21/577; G06F 21/566
See application file for complete search history.

(56) References Cited

U.S. PATENT DOCUMENTS

| 7,836,303 B2 | 11/2010 | Levy et al. |
| 8,370,938 B1 | 2/2013 | Daswani et al. |
| (Continued) | | |

FOREIGN PATENT DOCUMENTS

| CN | 103095681 A | 5/2013 |
| CN | 104462962 A | 3/2015 |
| WO | 2015084664 A1 | 6/2015 |

OTHER PUBLICATIONS

Chandra V, et al., "BIXSAN: Browser Independent XSS Sanitizer for Prevention of XSS Attacks", In ACM SIGSOFT Software Engineering Notes, vol. 36, Issue 5, Sep. 2011, 7 pages.

(Continued)

*Primary Examiner* — Amir Mehrmanesh
(74) *Attorney, Agent, or Firm* — Harness, Dickey & Pierce, P.L.C.

(57) ABSTRACT

A test object that includes at least one computer program that includes dynamic executable code is obtained. The at least one computer program is transformed into a format that is configured to execute in a hosted isolated computing environment. Directed execution of the at least one computer program is initiated, in the hosted isolated computing environment. Dynamic code vulnerabilities of the at least one computer program are detected, based on the directed execution.

20 Claims, 8 Drawing Sheets

(51) Int. Cl.
G06F 21/53 (2013.01)
G06F 21/55 (2013.01)
G06F 21/56 (2013.01)

(52) U.S. Cl.
CPC .......... *G06F 21/554* (2013.01); *G06F 21/566* (2013.01); *G06F 2221/033* (2013.01)

(56) References Cited

U.S. PATENT DOCUMENTS

| | | | |
|---|---|---|---|
| 8,407,790 | B2 | 3/2013 | Mony |
| 8,499,283 | B2 | 7/2013 | Mony |
| 8,601,586 | B1 | 12/2013 | Boutros et al. |
| 8,752,183 | B1 | 6/2014 | Heiderich et al. |
| 8,949,990 | B1 | 2/2015 | Hsieh et al. |
| 9,021,593 | B2 | 4/2015 | Liu et al. |
| 9,223,977 | B2 | 12/2015 | Amit et al. |
| 9,239,745 | B1 | 1/2016 | Pennington et al. |
| 9,317,693 | B2 | 4/2016 | Kuykendall et al. |
| 9,317,694 | B2 | 4/2016 | Arbabi et al. |
| 2009/0119769 | A1 | 5/2009 | Ross et al. |
| 2011/0197272 | A1 | 8/2011 | Mony |
| 2012/0174224 | A1 | 7/2012 | Thomas et al. |
| 2012/0198558 | A1 | 8/2012 | Liu et al. |
| 2013/0111594 | A1 | 5/2013 | Amit et al. |
| 2013/0111595 | A1 | 5/2013 | Amit et al. |
| 2013/0139266 | A1 | 5/2013 | Amit et al. |
| 2013/0139267 | A1 | 5/2013 | Amit et al. |
| 2013/0167237 | A1 | 6/2013 | Amit et al. |
| 2013/0185623 | A1 | 7/2013 | Wicker et al. |

OTHER PUBLICATIONS

Nadji, et al., "Document Structure Integrity: A Robust Basis for Cross-site Scripting Defense", In Proceedings of the Network and Distributed System Security Symposium, Feb. 8, 2009, 20 pages.

Yue, et al., "Characterizing Insecure JavaScript Practices on the Web", In Proceedings of the 18th International Conference on World Wide Web, Apr. 20, 2009, 10 pages.

Pelizzi, et al., "Large-Scale, Automatic XSS Detection using Google Dorks", Published on: Sep. 2012, Available at: http://www.cs.sunysb.edu/~rpelizzi/gdorktr.pdf.

Rieck, et al., "Cujo: Efficient Detection and Prevention of Drive-by-Download Attacks", In Proceedings of the 26th Annual Computer Security Applications Conference, Dec. 6, 2010, 9 pages.

Madsen, M. et al., "Practical Static Analysis of JavaScript Applications in the Presence of Frameworks and Libraries," Retrieved Dec. 2, 2013 at <<http://131.107.65.14/pubs/168635/tr.pdf>>, ESEC/FSE'13 Joint Meeting of the European Software Engineering Conference and the ACM SIGSOFT Symposium on the Foundations of Software Engineering, Saint Petersburg, Russian Federation, Aug. 18-26, 2013, 17 pages.

"Sandbox," retrieved Dec. 1, 2013 at <<http://searchsecurity.techtarget.com/definition/sandbox>>, Search Security, WhatIS.com, 3 pages.

"Sandbox," retrieved Dec. 1, 2013 at <<http://foldoc.org/sandbox>>, Free On-Line Dictionary of Computing (FOLDOC), 2 pages.

"International Search Report & Written Opinion for PCT Application No. PCT/US2014/067514", Mailed Date: Feb. 19, 2015, 11 Pages.

Klein, Amit, "DOM Based Cross Site Scripting or XSS of the Third Kind", Published On: Jul. 2005, Available at: http://www.webappsec.org/projects/articles/071105.html.

"International Preliminary Report on Patentability" for PCT Application No. PCT/US2014/067514, Mailed Date: Oct. 19, 2015, 20 Pages.

"Content Scripts", Published on: Feb. 28, 2014 Available at: https://developer.chrome.com/extensions/content_scripts.

Pelizzi, et al., "Large-Scale, Automatic XSS Detection using Google Darks", Published on: Sep. 12, 2014 Available at: http://www3.cs.stonybrook.edu/~rpelizzi/gdorktr.pdf.

Office Action mailed Jun. 5, 2015 for U.S. Appl. No. 14/095,538, with inventors Arbabi, et al., entitled "Directed Execution of Dynamic Programs in Isolated Environments," filed Dec. 3, 2013, 17 pages.

Response filed Nov. 13, 2015, in response to Office Action mailed Jun. 5, 2015 for U.S. Appl. No. 14/095,538, with inventors Arbabi, et al., entitled "Directed Execution of Dynamic Programs in Isolated Environments," filed Dec. 3, 2013, 14 pages.

Notice of Allowance mailed Dec. 14, 2015 for U.S. Appl. No. 14/095,538, with inventors Arbabi, et al., entitled "Directed Execution of Dynamic Programs in Isolated Environments," filed Dec. 3, 2013, 8 pages.

400B

(4a)
↓

─────────────────────────────────────── 412
The directed execution includes static testing that is performed without using
a browser, within the hosted isolated computing environment that includes a
computing environment that is under the control of only a single hosting entity
───────────────────────────────────────

(4b)
↓

───────────────────────────────────────
The directed execution includes instantiating an instance of at least one
computer program included in the test object, without using a browser, within
the hosted isolated computing environment that includes a computing
environment that is under the control of only a single hosting entity, with     414
references to referenced content items resolved to references to copies of the
referenced content items that have been obtained and stored locally within
the hosted isolated computing environment, and iterating through all different
execution paths of the at least one computer program to detect the dynamic
code vulnerabilities
───────────────────────────────────────

(4c)
↓

─────────────────────────────────────── 416
Obtaining the test object includes obtaining a first web page from an initial
source server, and obtaining one or more referenced content items from one
or more referenced sources that are referenced by content obtained from the
initial source server
───────────────────────────────────────

(4d)
↓

─────────────────────────────────────── 418
Statically analyze the obtained test object, to determine locations of sink
functions and entry points
───────────────────────────────────────

FIG. 4B

DIRECTED EXECUTION OF DYNAMIC PROGRAMS IN ISOLATED ENVIRONMENTS

CROSS-REFERENCE TO RELATED APPLICATION

This application is a continuation of, and claims benefit from, commonly assigned, co-pending U.S. patent application Ser. No. 14/095,538, with inventors Reza Arbabi et al., filed Dec. 3, 2013, entitled "Directed Execution of Dynamic Programs in Isolated Environments," which is hereby incorporated by reference herein in its entirety.

BACKGROUND

Dynamic executable code (e.g., JAVASCRIPT code) may be modified during execution, and such code may be executed on devices that are both local to a client, and external to the client. For example, as web applications have become popular with many users, the applications may include such dynamic executable code, and may provide services to users via code that executes locally, with references to potential sources of executable code on external devices that are not under the control of the individual user, thus introducing potential vulnerabilities to individual users. For example, cross-site scripting has become a prominent source of security issues that may cost significant revenue to resolve.

As an example, a Document Object Model (DOM) XSS detection technique may rely on testing a website by parsing all or a portion of a web page and its resources. Based on that, an analysis may provide warnings which may result in potential issues on the page. While this approach is suitable to discover some security bugs, it may provide false-positives, such that a security researcher may expend further resources to determine what is actually an error and what is expected behavior. Further, such static analysis may be limited in its capabilities with regard to inspecting dynamic languages (e.g., in attempting to statically determine the make-up of a dynamic language program at any point during runtime). Potential challenges in this area may include determining load ordering of files, accounting for Application Programming Interfaces (APIs) that may be constructed at runtime and may not be explicitly represented in source, and other elements of the page which are not generated on the client.

Approaches to resolving such issues may involve authoring a dynamic analysis which loads and/or exercises an unmodified, actual page while seeding it with fuzzed/dangerous sources (i.e., data points which are user-controlled and can be put to malicious purposes). This approach may be effective but raises issues of its own. For example, execution may be slow for these systems. For example, testing may be performed on an actual page, which may have undesirable side effects (e.g., provoking permanent changes on supporting servers, putting undesirable load on a site, etc).

SUMMARY

According to one general aspect, a system may include a dynamic program validation engine that includes an object acquisition component configured to obtain a test object that includes dynamic executable code. An object transformation component may be configured to transform at least a portion of the test object into a transformed format test object that is configured to execute in a hosted isolated computing environment. A directed execution component may be configured to initiate directed execution of the transformed format test object, in the hosted isolated computing environment, and a vulnerability detection component may be configured to detect dynamic code vulnerabilities of the test object, based on the directed execution.

According to another aspect, a test object that includes at least one computer program that includes dynamic executable code may be obtained. The at least one computer program is transformed into a format that is configured to execute in a hosted isolated computing environment. Directed execution of the at least one computer program may be initiated, in the hosted isolated computing environment. Further, dynamic code vulnerabilities of the at least one computer program may be detected, based on the directed execution.

According to another aspect, a computer program product tangibly embodied on a computer-readable storage medium may include executable code that may cause at least one data processing apparatus to obtain a test object that includes at least one computer program that includes dynamic executable code. Further, the data processing apparatus may transform the at least one computer program into a format that is configured to execute in a hosted isolated computing environment. Further, the data processing apparatus may initiate directed execution of the at least one computer program, in the hosted isolated computing environment. Further, the data processing apparatus may detect dynamic code vulnerabilities of the at least one computer program, based on the directed execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 4A-4E are a flowchart illustrating example operations of the system of FIG. 3.

DETAILED DESCRIPTION

I. Introduction

Figure 1:
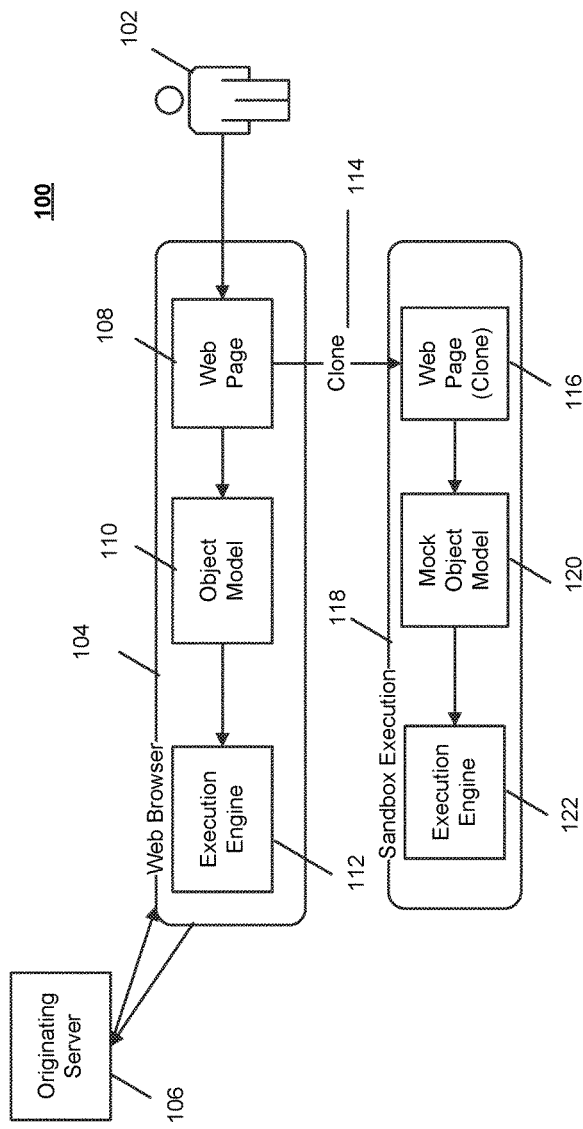
FIG. 1 is a block diagram illustrating an example system for directed execution of dynamic programs in isolated computing environments.

Issues associated with dynamic executable code (e.g., JAVASCRIPT code), which may be modified during execution, may manifest themselves via cross-site scripting (XSS), which has become a prominent source of security issues that may cost significant revenue to resolve. For example, it may cost significant resources to track down and resolve cross-site scripting issues that may be associated with web applications (e.g., via web development). Thus, it may be advantageous to ensure that XSS issues are detected as early as possible in the development phase of web applications. For example, it may be advantageous to ensure that vulnerabilities are detected in application code before malicious parties discover the vulnerabilities for exploitation.

There are several "flavors" of XSS issues, which may involve code injection vulnerabilities. For example, reflective XSS may involve a local client user sending a request to a web server, such that a payload is reflected back to the user, and executed on his/her local device. For example, persistent XSS may involve a first party attempting to save a payload (e.g., a malicious payload) in another party's database. As another example, a client may request a document or other object (e.g., a web page, that may include markup code (e.g., HyperText Markup Language (HTML) code, which may include embedded dynamic executable code such as JAVASCRIPT), that may include code that may request a source item that may include a payload that may be malicious, resulting in a client-side request for the malicious payload during client-side execution of the object's code (e.g., via a browser).

Example techniques discussed herein may address cross-site scripting issues that may exist client-side (e.g., some untrusted data may be processed in an insecure manner via JAVASCRIPT (JS) code running on the client, e.g., in a browser).

In accordance with example techniques discussed herein, a "snapshot" of a page may be obtained (e.g., acquired via download/closing all associated HTML/JS/other resources), to disk, or to any other type of storage media. For example, this snapshot may be rewritten and loaded into an isolated computing environment (e.g., a sandboxed environment) that provides an emulated DOM. For example, the sandboxed code may executed in directed ways that are intended to expose DOM XSS issues. For example, various techniques/optimizations may provide for faster exercising of the page under test.

Example techniques discussed herein may enable security researchers to discover DOM XSS vulnerability bugs on a page by exercising execution paths within the page, providing a pre-defined set of payloads to the page.

One skilled in the art of data processing may appreciate that static analysis of JAVASCRIPT by nature may be difficult, at least due to the issues discussed above. Additionally, page resources may be defer-loaded. The asynchronous nature of JAVASCRIPT may further add to difficulties in modeling code execution statically. For example, JAVASCRIPT may be used to construct new JS behaviors at runtime (e.g., including script loading, attribution of DOM elements with event handlers, and potentially, the wholesale construction of new types, methods, etc.).

A dynamic analysis of a page may generally have much more complete data with which to work. It may be challenging in these environments, however, to provoke specific execution paths that include a correctness or security issue. A particular issue here is that the runtime behavior of the DOM (and the JAVASCRIPT built-ins themselves) is not under the complete control of the test application.

Example techniques discussed herein may provide a system that permits systematic, arbitrary execution of a static set of resources that represent a page at a specific point in time. An example offline/sandboxed analysis can be modified/reproduced/etc. arbitrarily without putting load on actual resources, helping to reduce impact on the site. Execution may be fast, since no actual user interface (UI) is rendered, and arbitrary events are not firing/cascading as a result of user actions. Analysis is comprehensive, in the sense that a large set of possible code entry points may be detected and executed in a systematic way.

In accordance with example techniques discussed herein, execution state at arbitrary points may be captured, allowing for resetting to prior conditions (e.g., enabling a more efficient delivery of additional payloads to previously executed functions). Further, for example, the analysis may be easily repurposed to other program environments that include dynamic code (e.g., JAVASCRIPT) execution.

Example techniques discussed herein may provide a page acquisition and rewriting component, an isolated JAVASCRIPT execution environment, and an ability to mock/emulate the DOM as well as other runtime-available APIs. For example, a directed execution component may identify callable functions, providing directed payloads to them, and a program environment/DOM inspection component may both examine current page state in order to determine whether undesired/untrusted data has been injected into the page as a result of execution, as well as simply mock/receive callbacks from JavaScript methods that indicate that an example testing tool has successfully provoked execution of arbitrary code.

In accordance with example techniques discussed herein, current DOM state may be managed efficiently, allowing testing to "reset" to a prior condition (e.g., a prior state) which might otherwise be costly to reproduce (e.g., in order to perform additional testing with alternate payloads, emulated DOM/runtime behaviors, etc).

FIG. 1 is a block diagram illustrating an example system for directed execution of dynamic programs in an isolated computing environment (e.g., sandboxed directed execution). As shown in FIG. 1, a user 102 may interact with a web browser 104, which may request information (e.g., documents, other objects, resources) from an originating server 106. For example, the web browser 104 may obtain (e.g., via download from the originating server 106) a test object such as a web page 108. The web browser 104 is shown with an object model 110 and an execution engine 112 that may be used for typical processing/rendering of the web page 108.

However, in FIG. 1, the web page may be copied, or cloned (104) to a cloned web page 116, that may be stored in a sandboxed execution environment 118 that may include a mock object model 120 and an execution engine 122, that is separate from the web browser's (104) execution engine 112, as discussed further below.

Figure 2:
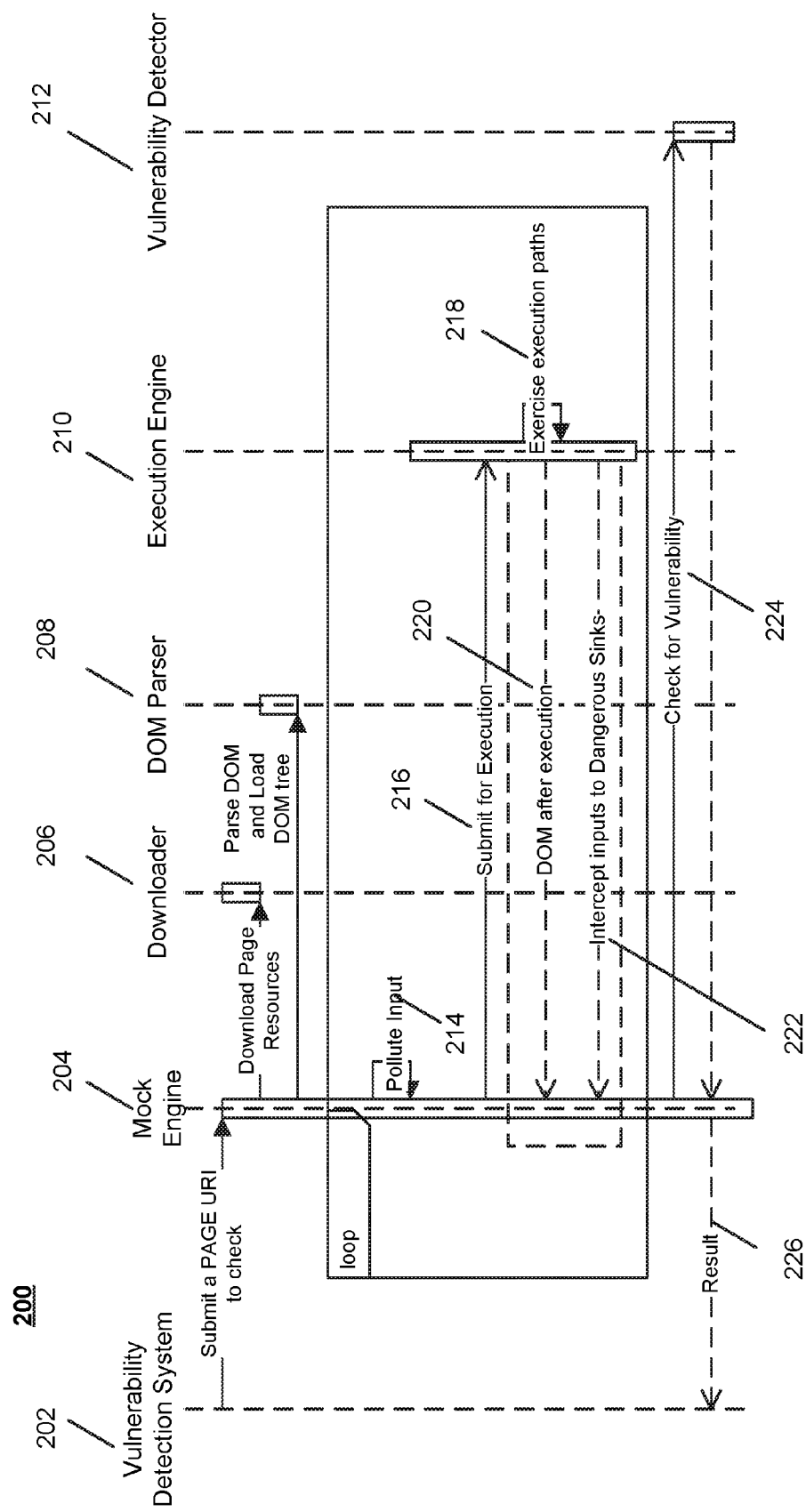
FIG. 2 is a block diagram illustrating an example technique for vulnerability detection.

FIG. 2 is a block diagram illustrating an example technique for vulnerability detection. As shown in FIG. 2, a vulnerability detection system 202 may include a mock engine 204, a downloader 206, a DOM parser 208, an execution engine 210, and a vulnerability detector 212. As shown in FIG. 2, a page Universal Resource Indicator (URI) may be submitted to the mock engine 204, so that the referenced page may be checked for potential vulnerabilities. An example test object (e.g., a web page) may be downloaded (e.g., by the downloader 206) based on the submitted URI. The mock engine 204 may parse the test object (e.g., parsing HyperText Markup Language (HTML) and Cascading Style Sheets (CSS)), and may create a deep copy version of the Document Object Model (DOM) in memory.

For example, potential sink functions which are able to change the DOM on the fly (e.g., document.write) may be mocked and may have an output which later is examined by the system. For example, possible inputs (e.g., Universal Resource Locator (URL), TextArea) may be polluted (214) by various payloads, by the mock engine 204 (i.e., insert known, or predetermined, payloads into user modifiable areas of code). For example, methods of interest may be overloaded.

In accordance with example techniques discussed herein, the downloader 206 may download page resources (e.g., resources referenced by the page, and its referenced pages). The DOM parser 208 may parse the DOM and load the DOM tree, as discussed further below. For example, as part of transformation of the downloaded items, names of downloaded referenced page resources may be modified to a local name, for storage on a local device that is within the hosted isolated computing environment (e.g., sandboxed environment). For example, references to the page resources, within the page, may be replaced by the modified name.

After transformation, the transformed page is submitted (216) to the execution engine 210 for execution. For example, different execution paths on the DOM may be exercised (218) by the execution engine 210 (e.g., all the DOM events, i.e., page-load). For example, the methods (e.g., functions) of interest may be executed by the execution engine 210.

In accordance with example techniques discussed herein, in-memory DOM may be examined after execution (220). In accordance with example techniques discussed herein, inputs to "dangerous" sinks may be intercepted (222). For example, changes to the DOM may be observed (224) to determine whether the inserted payloads are executed. For example, if the payload appears on the DOM, it may be determined to be a DOM XSS vulnerability, which may be reported as a result 226.

One skilled in the art of data processing will appreciate that there may be many ways to accomplish the directed execution of dynamic programs discussed herein, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 3:
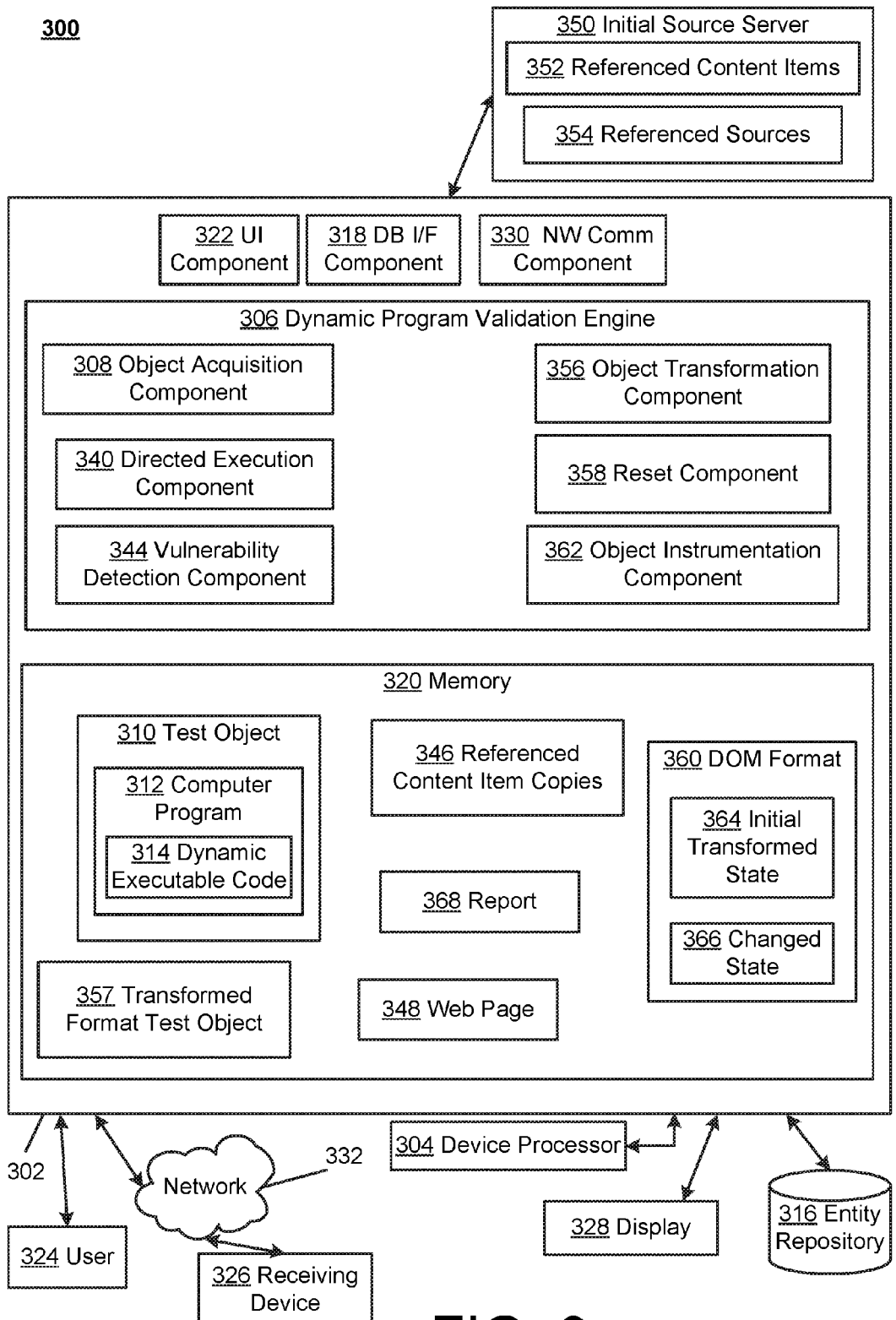
FIG. 3 is a block diagram illustrating an example system for directed execution of dynamic programs.

As further discussed herein, FIG. 3 is a block diagram of a system 300 for directed execution of dynamic code in isolated environments. As shown in FIG. 3, a system 300 may include a device 302 that includes at least one processor 304. The device 302 may include a dynamic program validation engine 306 that may include an object acquisition component 308 that may be configured to obtain a test object 310 that includes dynamic executable code 314. As an example, the test object 310 may include at least one computer program 312. For example, the test object 310 may include a web page that may include HyperText Markup Language (HTML) and JAVASCRIPT code, or other executable scripts embedded in markup language. However, the test object 310 may include other types of data/information as well.

According to an example embodiment, the dynamic program validation engine 306, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 304 is depicted as external to the dynamic program validation engine 306 in FIG. 3, one skilled in the art of data processing will appreciate that the device processor 304 may be implemented as a single component, and/or as distributed units which may be located internally or externally to the dynamic program validation engine 306, and/or any of its elements.

For example, the system 300 may include one or more processors 304. For example, the system 300 may include at least one tangible computer-readable storage medium storing instructions executable by the one or more processors 304, the executable instructions configured to cause at least one data processing apparatus to perform operations associated with various example components included in the system 300, as discussed herein. For example, the one or more processors 304 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of computational entity configured with functionality that may be implemented by instructions that may be located in a single entity, or may be spread or distributed over multiple entities, and may overlap with instructions and/or hardware associated with other components.

According to an example embodiment, the dynamic program validation engine 306 may be implemented in association with one or more user devices. For example, the dynamic program validation engine 306 may communicate with one or more servers, as discussed further below.

For example, an entity repository 316 may include one or more databases, and may be accessed via a database interface component 318. One skilled in the art of data processing will appreciate that there are many techniques for storing repository information discussed herein, such as various types of database configurations (e.g., relational databases, hierarchical databases, distributed databases) and non-database configurations.

According to an example embodiment, the dynamic program validation engine 306 may include a memory 320 that may store the test object 310 (e.g., or a representation thereof). In this context, a "memory" may include a single memory device or multiple memory devices configured to store data and/or instructions. Further, the memory 320 may span multiple distributed storage devices.

According to an example embodiment, a user interface component 322 may manage communications between a user 324 and the dynamic program validation engine 306. The user 324 may be associated with a receiving device 326 that may be associated with a display 328 and other input/output devices. For example, the display 328 may be configured to communicate with the receiving device 326, via internal device bus communications, or via at least one network connection.

According to example embodiments, the display 328 may be implemented as a flat screen display, a print form of display, a two-dimensional display, a three-dimensional display, a static display, a moving display, sensory displays such as tactile output, audio output, and any other form of output for communicating with a user (e.g., the user 324).

According to an example embodiment, the dynamic program validation engine 306 may include a network communication component 330 that may manage network communication between the dynamic program validation engine 306 and other entities that may communicate with the dynamic program validation engine 306 via at least one network 332. For example, the network 332 may include at least one of the Internet, at least one wireless network, or at least one wired network. For example, the network 332 may include a cellular network, a radio network, or any type of network that may support transmission of data for the dynamic program validation engine 306. For example, the network communication component 330 may manage network communications between the dynamic program validation engine 306 and the receiving device 326. For example, the network communication component 330 may manage network communication between the user interface component 322 and the receiving device 326.

An object transformation component 356 may be configured to transform at least a portion of the test object 310 into a transformed format test object 357 that is configured to execute in a hosted isolated computing environment. For example, the hosted isolated computing environment may include a local hosted sandboxed computing environment. For example, the hosted isolated computing environment may include a computing environment that is under the control of only a single hosting entity. For example, the single hosting entity may be the sole transformer and persister of storage and execution during testing of the test object 310 (e.g., on a single computing device, or a plurality of devices (e.g., in a distributed manner)). For example, testing/analysis may be performed comprehensively within a local process boundary using only resources that are under the control of a local testing tool of a user of the dynamic program validation engine 306.

A directed execution component 340 may be configured to initiate directed execution of the transformed format test object 357, in the hosted isolated computing environment.

A vulnerability detection component 344 may be configured to detect dynamic code vulnerabilities of the test object 310, based on the directed execution.

For example, the directed execution component 340 may be configured to initiate the directed execution of the transformed format test object 357, in the hosted isolated computing environment, without accessing non-local source servers from which the test object 310 was obtained, and without accessing non-local referenced servers that are referenced by the test object 310.

For example, the directed execution may be performed without using a browser, within the hosted isolated computing environment that includes a computing environment that is under the control of only a single hosting entity.

For example, the directed execution may include instantiating an instance of at least one computer program 312 included in the test object 310 without using a browser, within the hosted isolated computing environment that includes a computing environment that is under the control of only a single hosting entity, with references to referenced content items 352 resolved to references to copies 346 of the referenced content items 352 that have been obtained and stored locally within the hosted isolated computing environment, and iterating through all different execution paths of the at least one computer program 312 to detect the dynamic code vulnerabilities.

For example, obtaining the test object 310 may include obtaining a first web page 348 from an initial source server 350, and obtaining one or more referenced content items 352 from one or more referenced sources 354 that are referenced by content obtained from the initial source server 350.

For example, at least a portion of the test object 310 may be transformed into a format that is configured to execute in the hosted isolated computing environment without accessing non-local source servers from which the test object 310 was obtained, and without accessing non-local referenced servers that are referenced by the test object 310.

For example, a reset component 358 may be configured to reset a state of the transformed format test object 357 to a prior version during testing. For example, states of the test object and/or the transformed format test object 357 may preserved as testing/analysis proceeds, to enable such resetting.

For example, transforming the at least a portion of the test object may include replacing item names of referenced content items with local reference names corresponding to Universal Resource Identifiers (URIs) located in the hosted isolated computing environment, where the referenced content items 352 are stored locally, after download from one or more referenced sources 354 that are external to the hosted isolated computing environment, and replacing Universal Resource Identifiers (URIs) included in code of at least one computer program included in the test object with corresponding ones of the local reference names.

For example, the object transformation component 356 may be configured to transform the at least a portion of the test object 310 into a locally stored document object model (DOM) format 360 that is configured to model at least one computer program 312 included in the test object 310, with Universal Resource Identifiers (URIs) modified to reference only items located locally to the hosted isolated computing environment.

For example, an object instrumentation component 362 may be configured to instrument the transformed format test object 357 for testing at least a portion of the dynamic executable code 314 for cross-site scripting (XSS) vulnerabilities.

For example, the vulnerability detection component 344 may be configured to detect the dynamic code vulnerabilities of the test object 310 based on determining one or more changes in state of the transformed DOM format 360, from an initial transformed state 364, to a changed state 366, after the directed execution locally in the hosted isolated computing environment. For example, it may be determined that input during execution is not "sanitized," such that unacceptable or undesirable (form a user perspective) content appears on the DOM during, or after directed execution. As an example, characters that may be specific to executable code may not be "sanitized," thus indicating a potential input of executable (e.g., possible malicious) code during execution.

For example, example techniques discussed herein may replace potentially unacceptable sink functions, enabling an analysis of data (e.g., test payloads) to determine potentially undesirable effects of execution of such sink functions (e.g., unacceptable sink functions that may potentially input executable code from an external source, during actual execution).

For example, determining one or more changes in state of the transformed DOM format 360 may include determining whether the dynamic executable code 314 is configured for execution-time modification of the dynamic executable code to an unacceptable execution state, from a user perspective. For example, the unacceptable execution state may include an injected malicious code execution state.

For example, the directed execution of the transformed format test object 357 may include directed execution of the transformed format test object 357 that is comprehensively performed within a local process boundary using only resources that are under the control of a local testing tool of a user of the dynamic program validation engine 306.

For example, the directed execution of the transformed format test object 357 may include directed execution of the transformed format test object 357 that is performed within a local process boundary using only resources that are under the control of a local testing tool, as a background process to a browser processing of the test object 310, that is not configured to be performed totally within the hosted isolated computing environment.

For example, the vulnerability detection component 344 may be configured to initiate a blocking of one or more execution paths of at least one computer program 312 included in the test object 310, based on one or more detected dynamic code vulnerabilities of the at least one computer program 312, after detection by the local testing tool.

For example, the vulnerability detection component 344 may be configured to provide a report 368 of the dynamic code vulnerabilities of the test object 310.

For example, the obtained test object 310 may be statically analyzed, to determine locations of sink functions and entry points. For example, an analysis for sink functions and/or entry points may be performed by the object acquisition component 308. For example, an analysis for sink functions and/or entry points may be performed by the object transformation component 308, and/or other components of the dynamic program validation component 306.

For example, code entry points may include origins of execution in the code, that are not under a code developer's control. As an example, an entry point may be called by an event handler during execution.

For example, an analysis may identify locations in code that are intended to be called by a browser. Example techniques discussed herein may then assume responsibility for such calls, within the local hosted isolated computing environment, thus providing a type of "surrogate" for an actual user that may use the browser in actual execution. Example techniques discussed herein may further provide a type of "surrogate" for one or more external servers external data sources that may be requested in actual execution, instead providing input data from within the local hosted isolated computing environment.

For example, sink functions may process more input flow than output flow, during execution.

For example, a Universal Resource Identifier (URI) may be obtained, that references the test object 310, that is located at an external resource that is not under control of a local testing tool that performs the directed execution.

For example, the dynamic executable code 314 may include JAVASCRIPT code.

For example, an example code snippet may be include HTML source code as shown in Example 1:

| HTML Code Snippet #1 |
|---|
| 1  <!DOCTYPE html PUBLIC "-//W3C// DTD XHTML 1.0 Transitional//EN" "http://www.w3.org/TR/xhtml1/DTD/xhtml1-transitional.dtd"> <html |
| 2      xmlns="http://www.w3.org/1999/xhtml"> |
| 3      <head> |
| 4          <script type="text/javascript"> |
| 5          function TestSource1(str) |
| 6          { |
| 7              var queryString = new QueryString(str); |
| 8              document.write(queryString.content); |
| 9          } |
| 10         </script> |
| 11     </head> |
| 12     <body > |
| 13         <input type="button" value="TestSource1" id="Button1" onclick="TestSource1(document.location.hash)" /> |
| 14     </body> |
| 15 </html> |

Example 1

As shown in the code snippet of Example 1, the HTML code includes a function (at line 5) "TestSource1" with parameter "str", which is written (line 8), via a "document.write" statement. As shown in line 13, the input type is "button," with input, on click of the button, from "TestSource1(document.location.hash)".

An example payload for this code may be obtained as:

$$\text{<script>window.alert('Dom XSS');</script>} \quad (1)$$

For example, in inspection, the content will be the same as the payload.

In accordance with example techniques discussed herein, if HTML parsing is performed to verify the final output, the "document.write" command of line 8 of Example 1 may be replaced with other code (e.g., with "[Html Element]. value=query String.content").

One skilled in the art of data processing will appreciate that many different techniques may be used for directed execution of dynamic programs in hosted isolated computing environment (e.g., sandboxed directed execution), without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 4A:
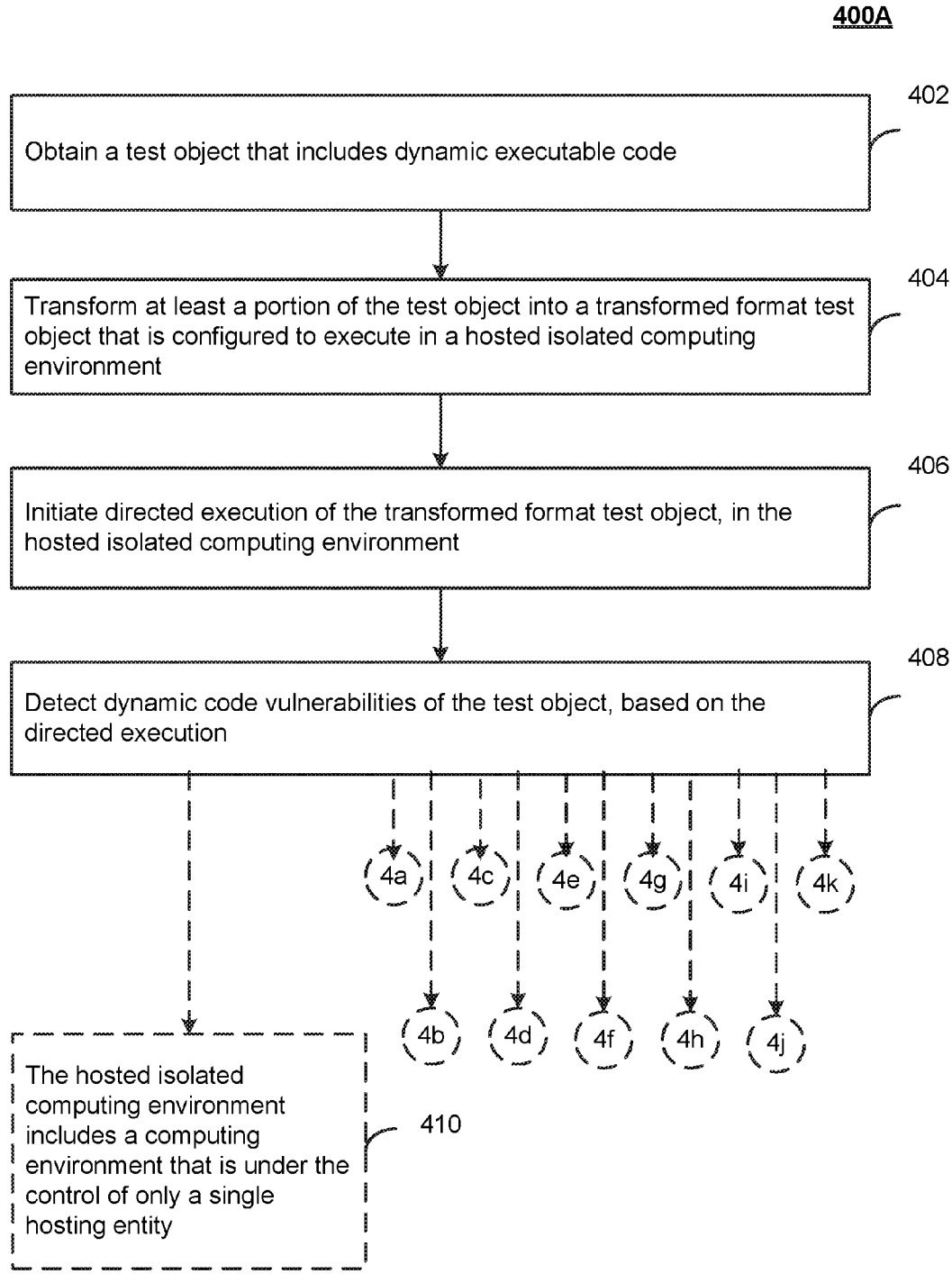

FIGS. 4A-4E are a flowchart illustrating example operations of the system of FIG. 3, according to example embodiments. In the example of FIG. 4A, a test object that includes dynamic executable code may be obtained (402). For example, the test object may include at least one computer program. For example, the object acquisition component 308 may obtain the test object 310 that includes dynamic executable code 314, as discussed above.

At least a portion of the test object may be transformed into a transformed format test object that is configured to execute in the hosted isolated computing environment (404), as discussed above.

Directed execution of the transformed format test object may be initiated, in the hosted isolated computing environment (406). For example, the directed execution component 340 may initiate directed execution of the transformed format test object 357, in the hosted isolated computing environment, as discussed above.

Dynamic code vulnerabilities of the test object may be detected, based on the directed execution (408). For example, the vulnerability detection component 344 may detect dynamic code vulnerabilities of the test object 310, based on the directed execution, as discussed above.

For example, the hosted isolated computing environment may include a computing environment that is under the control of only a single hosting entity (410).

For example, the directed execution may include static testing that is performed without using a browser, within the hosted isolated computing environment that includes a computing environment that is under the control of only a single hosting entity (412), in the example of FIG. 4B.

For example, the directed execution may include instantiating an instance of the at least one computer program included in the test object without using a browser, within the hosted isolated computing environment that includes a computing environment that is under the control of only a single hosting entity, with references to referenced content items resolved to references to copies of the referenced content items that have been obtained and stored locally within the hosted isolated computing environment, and iterating through all different execution paths of the at least one computer program to detect the dynamic code vulnerabilities (414).

For example, obtaining the test object may include obtaining a first web page from an initial source server, and obtaining one or more referenced content items from one or more referenced sources that are referenced by content obtained from the initial source server (416).

For example, the obtained test object may be statically analyzed, to determine locations of sink functions and entry points (418).

Figure 4C:
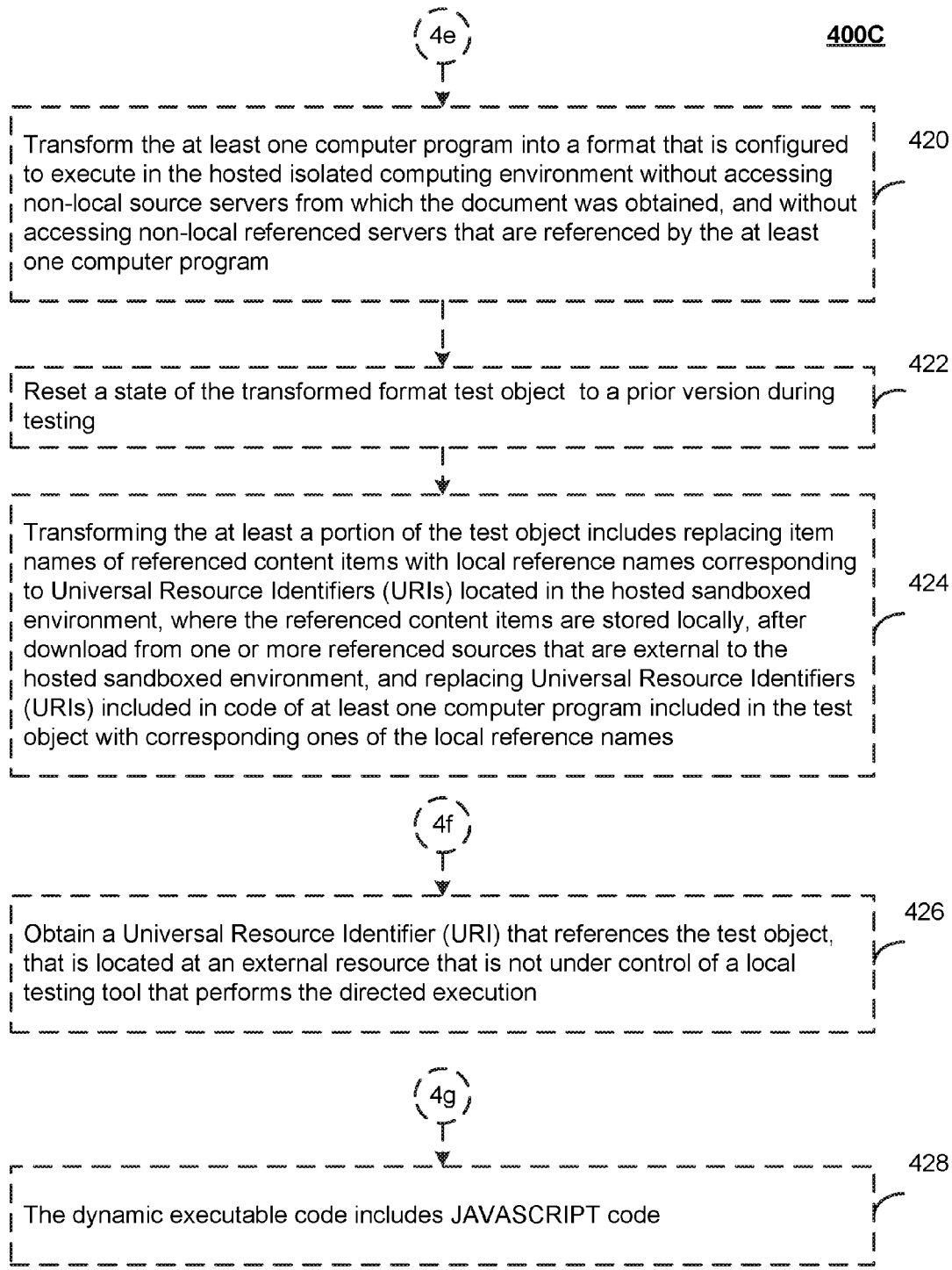

For example, at least one computer program may be transformed into a format that is configured to execute in the hosted isolated computing environment without accessing non-local source servers from which the test object was obtained, and without accessing non-local referenced servers that are referenced by the at least one computer program (420), in the example of FIG. 4C. For example, the object transformation component 356 may transform the at least one computer program 312 into a format that is configured to execute in the hosted sandboxed environment 342 without accessing non-local source servers from which the test object 310 was obtained, and without accessing non-local referenced servers that are referenced by the at least one computer program 312, as discussed above.

For example, a state of the transformed format test object may be reset to a prior version during testing (422). For example, the reset component 358 may reset a state of the transformed format test object 357 to a prior condition during testing, as discussed above.

For example, transforming the at least a portion of the test object 310 may include replacing item names of referenced content items with local reference names corresponding to Universal Resource Identifiers (URIs) located in the hosted isolated computing environment, where the referenced content items are stored locally, after download from one or more referenced sources that are external to the hosted isolated computing environment, and replacing Universal Resource Identifiers (URIs) included in code of at least one computer program included in the test object with corresponding ones of the local reference names (424).

For example, a Universal Resource Identifier (URI) may be obtained, that references the test object, that is located at an external resource that is not under control of a local testing tool that performs the directed execution (426).

For example, the dynamic executable code may include JAVASCRIPT code (428).

Figure 4D:
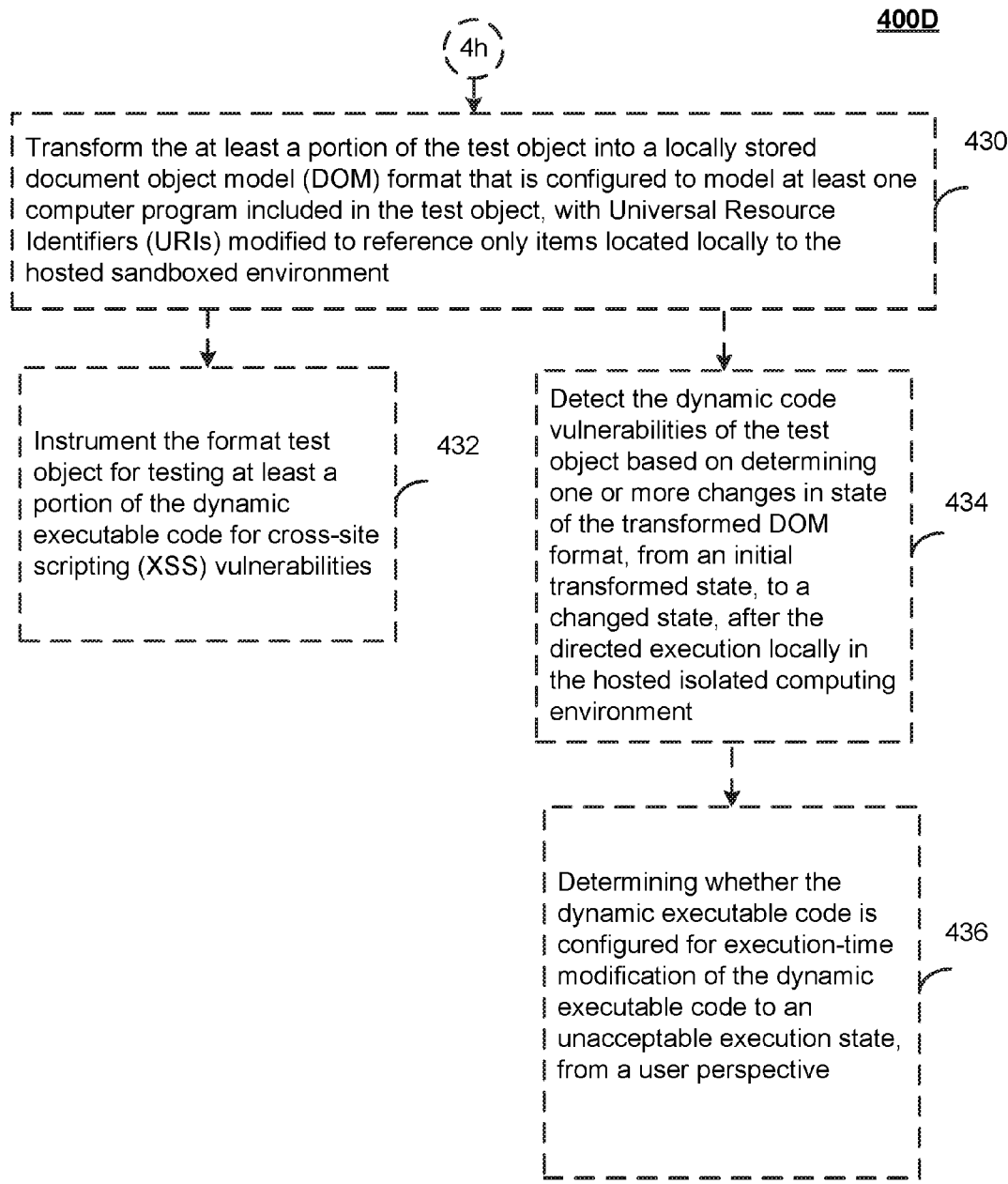

For example, the at least a portion of the test object may be transformed into a locally stored document object model (DOM) format that is configured to model at least one computer program included in the test object, with Universal Resource Identifiers (URIs) modified to reference only items located locally to the hosted isolated computing environment (430), in the example of FIG. 4D. For example, the object transformation component 356 may transform the at least a portion of the test object 310 into a locally stored document object model (DOM) format 360 that is configured to model at least one computer program 312 included in the test object 310, with Universal Resource Identifiers (URIs) modified to reference only items located locally to the hosted isolated computing environment, as discussed above.

For example, the transformed format test object may be instrumented for testing at least a portion of the dynamic executable code for cross-site scripting (XSS) vulnerabilities (432). For example, the object instrumentation component 362 may instrument the transformed format test object 357 for testing at least a portion of the dynamic executable code 314 for cross-site scripting (XSS) vulnerabilities, as discussed above.

For example, the dynamic code vulnerabilities of the test object may be detected based on determining one or more changes in state of the transformed DOM format, from an initial transformed state, to a changed state, after the directed execution locally in the hosted isolated computing environment (434). For example, the vulnerability detection component 344 may detect the dynamic code vulnerabilities of the test object 310 based on determining one or more changes in state of the transformed DOM format 360, from an initial transformed state 364, to a changed state 366, after the directed execution locally in the hosted isolated computing environment, as discussed above.

For example, determining one or more changes in state of the transformed DOM format may include determining whether the dynamic executable code is configured for execution-time modification of the dynamic executable code to an unacceptable execution state, from a user perspective (436).

Figure 4E:
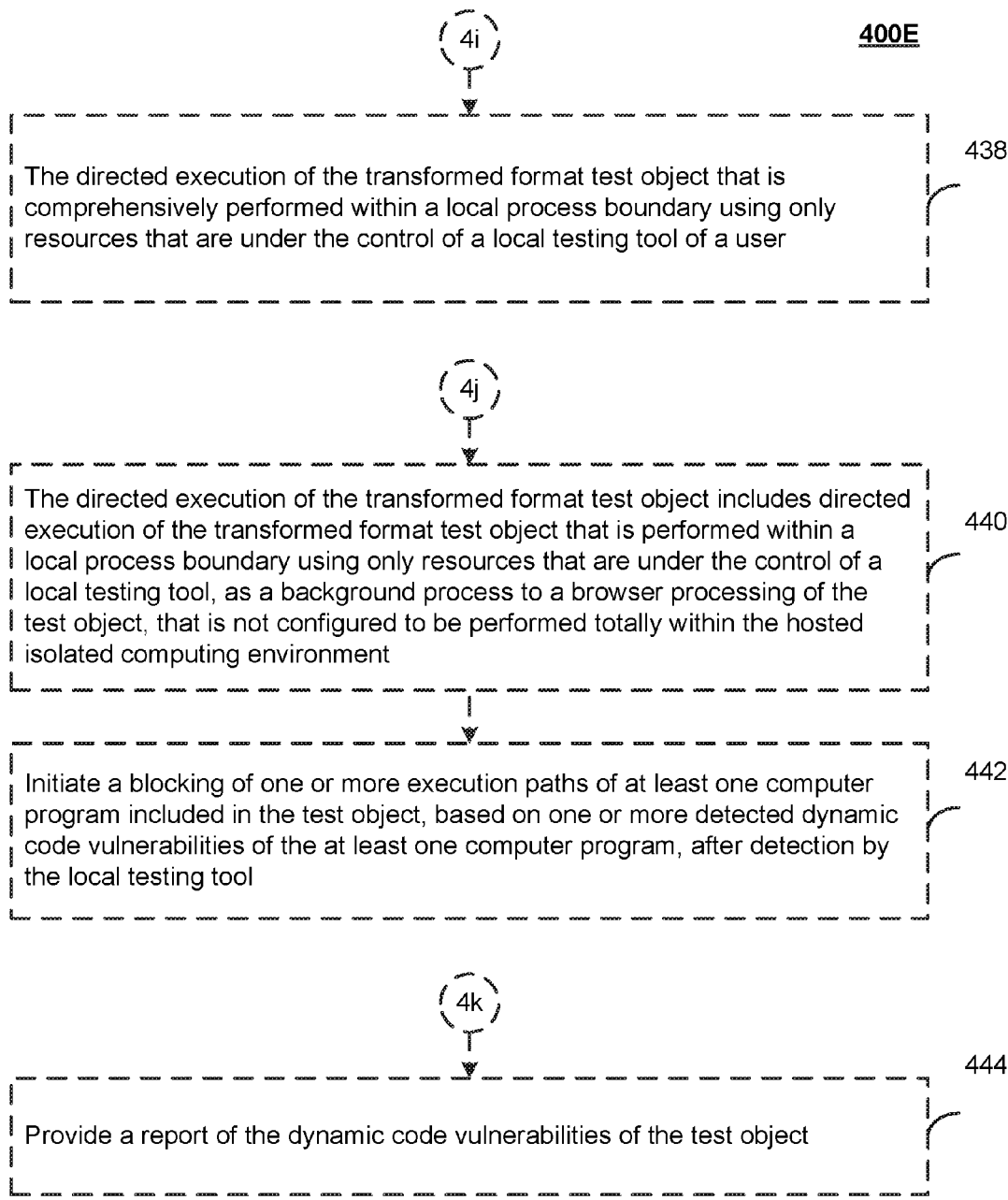

For example, the directed execution of the transformed format test object may include directed execution of the transformed format test object that is comprehensively performed within a local process boundary using only resources that are under the control of a local testing tool of a user of the dynamic program validation engine (438), in the example of FIG. 4E.

For example, the directed execution of the transformed format test object may include directed execution of the transformed format test object that is performed within a local process boundary using only resources that are under the control of a local testing tool, as a background process to a browser processing of the test object, that is not configured to be performed totally within the hosted isolated computing environment (440).

For example, a blocking of one or more execution paths of at least one computer program included in the test object may be initiated, based on one or more detected dynamic code vulnerabilities of the at least one computer program, after detection by the local testing tool (442). For example, the vulnerability detection component 344 may initiate a blocking of one or more execution paths of the at least one computer program 312, based on one or more detected dynamic code vulnerabilities of the at least one computer program 312, after detection by the local testing tool, as discussed above.

For example, a report of the dynamic code vulnerabilities of the test object may be provided (444). For example, the vulnerability detection component 344 may provide a report 368 of the dynamic code vulnerabilities of the test object 310, as discussed above.

One skilled in the art of data processing will understand that there may be many ways of performing directed execution of dynamic programs, without departing from the spirit of the discussion herein.

Customer privacy and confidentiality have been ongoing considerations in data processing environments for many years. Thus, example techniques for directed execution of dynamic programs may use user input and/or data provided by users who have provided permission via one or more subscription agreements (e.g., "Terms of Service" (TOS) agreements) with associated applications or services associated with such validation. For example, users may provide consent to have their input/data transmitted and stored on devices, though it may be explicitly indicated (e.g., via a user accepted agreement) that each party may control how transmission and/or storage occurs, and what level or duration of storage may be maintained, if any. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations will be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor;
   a receiver that obtains, via the at least one hardware device processor, a test object that includes dynamic executable code;
   a transformer that transforms at least a portion of the test object into a transformed format test object that is configured to execute in a hosted isolated computing environment, the transforming including transforming the at least a portion of the test object into a locally stored document object model (DOM) format that is configured to model at least one computer program included in the test object, the transforming including modifying Universal Resource Identifiers (URIs) to reference only items located locally to the hosted isolated computing environment;
   an execution engine that initiates, via the at least one hardware device processor, directed execution of the transformed format test object, in the hosted isolated computing environment; and
   a detector that detects dynamic code vulnerabilities of the test object, based on the directed execution.

2. The system of claim 1, wherein:
   the execution engine initiates the directed execution of the transformed format test object, in the hosted isolated computing environment, without accessing non-local source servers from which the test object was obtained, and without accessing non-local referenced servers that are referenced by the test object.

3. The system of claim 1, wherein:
   the directed execution is performed without using a browser, within the hosted isolated computing environment that includes a computing environment that is under the control of only a single hosting entity.

4. The system of claim 1, wherein:
   the directed execution includes instantiating an instance of at least one computer program included in the test object, without using a browser, within the hosted isolated computing environment that includes a computing environment that is under the control of only a single hosting entity, with references to referenced content items resolved to references to copies of the referenced content items that have been obtained and stored locally within the hosted isolated computing environment, and iterating through all different execution paths of the at least one computer program to detect the dynamic code vulnerabilities.

5. The system of claim 1, wherein:
   obtaining the test object includes obtaining a first web page from an initial source server, and obtaining one or more referenced content items from one or more referenced sources that are referenced by content obtained from the initial source server.

6. The system of claim 1, further comprising:
   a resetter that resets a state of the transformed format test object to a prior version during testing.

7. The system of claim 1, wherein:
   transforming the at least a portion of the test object includes:
   replacing item names of referenced content items with local reference names corresponding to Universal Resource Identifiers (URIs) located in the hosted isolated computing environment, wherein the referenced content items are stored locally, after download from one or more referenced sources that are external to the hosted isolated computing environment, and
   replacing Universal Resource Identifiers URIs included in code of the at least one computer program included in the test object with corresponding ones of the local reference names.

8. The system of claim 1, further comprising:
   an instrumenter that instruments the transformed format test object for testing at least a portion of the dynamic executable code for cross-site scripting (XSS) vulnerabilities.

9. The system of claim 1, wherein:
   the detector detects the dynamic code vulnerabilities of the test object based on determining one or more changes in state of the transformed DOM format, from an initial transformed state, to a changed state, after the directed execution locally in the hosted isolated computing environment.

10. The system of claim 9, wherein:
    determining one or more changes in state of the transformed DOM format includes determining whether the dynamic executable code is configured for execution-time modification of the dynamic executable code to an unacceptable execution state, from a user perspective.

11. The system of claim 1, wherein:
the directed execution of the transformed format test object includes directed execution of the transformed format test object that is comprehensively performed within a local process boundary using only resources that are under the control of a local testing tool of a user of a dynamic program validation engine.

12. The system of claim 1, wherein:
the directed execution of the transformed format test object includes directed execution of the transformed format test object that is performed within a local process boundary using only resources that are under the control of a local testing tool, as a background process to a browser processing of the test object, that is not configured to be performed totally within the hosted isolated computing environment.

13. The system of claim 12, wherein:
the detector initiates a blocking of one or more execution paths of at least one computer program included in the test object, based on one or more detected dynamic code vulnerabilities of the at least one computer program, after detection by the local testing tool.

14. The system of claim 1, wherein:
the detector provides a report of the dynamic code vulnerabilities of the test object.

15. A non-transitory computer readable medium storing executable code that, when executed by one or more processors, cause the one or more processors to:
obtain a test object that includes at least one computer program that includes dynamic executable code;
transform the at least one computer program into a locally stored document object model (DOM) format that is configured to execute in a hosted isolated computing environment and that is configured to model the at least one computer program, the transformation the at least one computer program including modifying Universal Resource Identifiers (URIs) to reference only items located locally to the hosted isolated computing environment;
initiate directed execution of the at least one computer program in the hosted isolated computing environment; and
detect dynamic code vulnerabilities of the at least one computer program, via at least one device processor, based on the directed execution.

16. The non-transitory computer readable medium of claim 15, wherein the code further causes the one or more processors to:
statically analyze the obtained test object, to determine locations of sink functions and entry points.

17. The non-transitory computer readable medium of claim 15, wherein the code further causes the one or more processors to:
obtain a Universal Resource Identifier (URI) that references the test object, that is located at an external resource that is not under control of a local testing tool that performs the directed execution.

18. A method comprising:
obtaining a test object that includes dynamic executable code;
transforming, via at least one hardware device processor, at least a portion of the test object into a transformed format test object that is configured to execute in a hosted isolated computing environment, the transforming including transforming the at least a portion of the test object into a locally stored document object model (DOM) format that is configured to model at least one computer program included in the test object, the transforming including modifying Universal Resource Identifiers (URIs) to reference only items located locally to the hosted isolated computing environment;
initiating, via the at least one hardware device processor, directed execution of the transformed format test object, in the hosted isolated computing environment; and
detecting dynamic code vulnerabilities of the test object, based on the directed execution.

19. The method of claim 18, wherein:
the dynamic executable code includes JAVASCRIPT code.

20. The method of claim 18, wherein:
obtaining the test object includes obtaining a first web page from an initial source server, and obtaining one or more referenced content items from one or more referenced sources that are referenced by content obtained from the initial source server.

* * * * *